April 6, 1926.
T. G. LOUIS
MAGNETO
Filed April 17, 1923
1,579,331
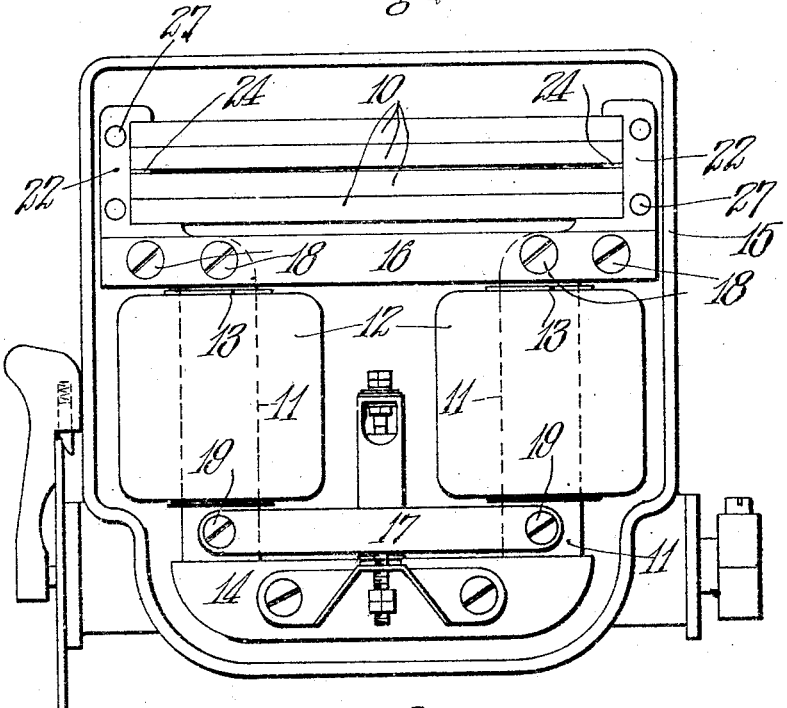
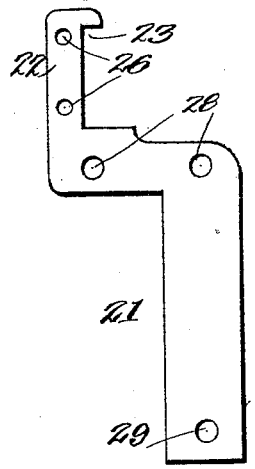
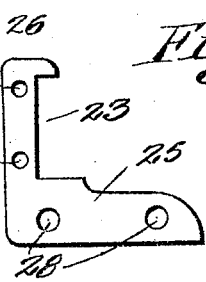
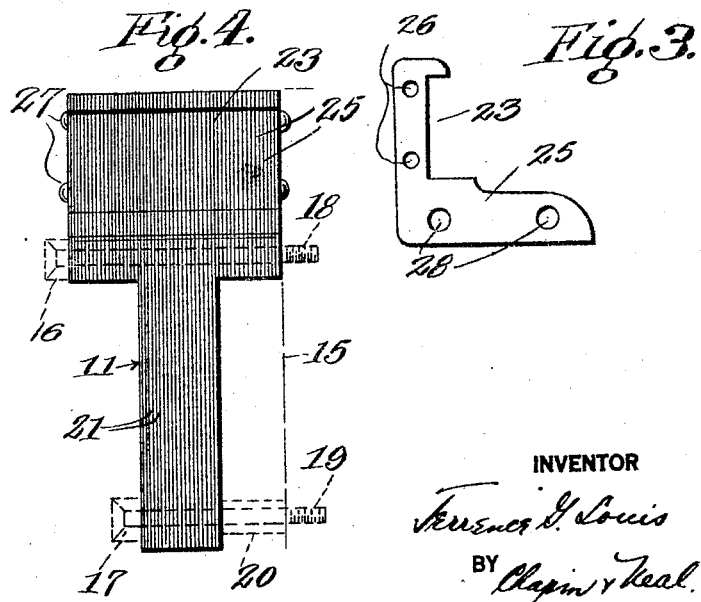
INVENTOR
Terrence G. Louis
BY Chapin & Neal
ATTORNEYS Patented Apr. 6, 1926.

1,579,331

UNITED STATES PATENT OFFICE.

TERRENCE G. LOUIS, OF SPRINGFIELD, MASSACHUSETTS.

MAGNETO.

Application filed April 17, 1923. Serial No. 632,688.

*To all whom it may concern:*

Be it known that I, TERRENCE G. LOUIS, a citizen of the United States, residing at Springfield, in the county of Hampden and State of Massachusetts, have invented new and useful Improvements in Magnetos, of which the following is a specification.

This invention relates to magnetos and more particularly to improvements in the mechanical construction of the magnetic field structure thereof.

This application is a continuation in part of my copending application for U. S. Letters Patent filed May 26, 1922 under Serial No. 563,911.

The object of the invention is to provide an improved means for mechanically and magnetically connecting one or more permanent magnets to the cores, pole pieces or like parts of a magnetic circuit.

According to the invention, the magnets may be directly connected to the grouped laminations of the core without the use of bolts extending through the magnets and without the use of any intermediate connecting parts, such as clips or pole pieces or the like. This object is attained by employing specially-shaped laminations which have substantially U-shaped recesses to receive the ends of the magnets, such ends being frictionally held in the recesses in any suitable manner to secure an adequate mechanical and magnetic connection between the magnets and core.

In this way drilling, or other machining, operations on the magnets are unnecessary, which is a considerable advantage because the magnets are made of hardened steel. To drill or machine the magnets an annealing operation is first necessary, and, after the machining operation, the magnet must again be hardened. Repeated annealing and hardening of steel has a detrimental effect on its magnetic retentivity and the magnet manufacturer desires to avoid these operations, not only for the reason noted but to reduce cost of manufacture. Suitable steel, already hardened, may be purchased in the market and cut up into proper lengths for bar magnets by a simple shearing operation and the latter operation can readily be performed without annealing. Thus bar magnets may be produced at a minimum cost in this manner and the present invention renders this method of manufacture commercially feasible by supplying the means for connecting the magnets to the core.

According to another feature of the invention, the magnet receiving portions of the core laminations are supplemented by other laminations of similar shape, applied in groups to opposite sides thereof, thus forming an effective magnet receiving portion much wider than the core.

By the use of this feature of the invention, the usual intermediate pole pieces are dispensed with for the core can be broadened out at one end to receive the wider magnets by the use of the supplementary laminations. In this manner one joint in the magnetic circuit is avoided, which is a substantial advantage since the elimination of a joint means a reduction in the reluctance of the magnetic circuit.

Other objects and advantages will appear in the following description and in the illustrative embodiment of the invention in the accompanying drawings, in which:—

Fig. 1 is a front elevational view of a magneto showing the invention;

Figs. 2 and 3 are plan views showing the main and supplementary laminations, respectively; and Fig. 4 is an end elevational view of a combined core and magnet receiving pole piece made up from laminations such as shown in Figs. 2 and 3.

Referring to these drawings; the invention is largely independent of the particular type of magneto in which it is embodied and the magneto shown in Fig. 1 is given merely as an illustrative example of one suitable type. The magneto illustrated, includes a source of magnetic flux, consisting of a group of permanent magnets, herein shown as two series of superposed bar magnets 10. The ends of this group of magnets are connected, in a manner to be described, one to each of a pair of spaced cores 11, which receive the coils, such as 12 and 13. The free ends of cores 11 are adapted to be periodically connected together by an armature 14, which is movable toward and away from cores 11 by any suitable mechanism. This mechanism has not been illustrated herein as it is unnecessary to an understanding of the present invention.

The magnetic field structure, comprising the elements 10 and 11, is supported on a suitable frame 15. As shown, the upper and lower ends of the cores 11 are held in laterally spaced relation by straps 16 and 17, respectively, of nonmagnetic material and bolts 18 and 19, respectively, pass through these straps and the adjacent cores and are threaded into frame 15, as indicated in Fig. 4. A spacing sleeve 20 is slipped over each bolt 19 and is disposed between frame 15 and the adjacent face of its core 11. The connections, just described, are merely illustrative and many other expedients for accomplishing the same results will occur to those skilled in the art.

The cores 11, following preferred practice, are made up of soft iron laminations, one of which is shown at 21 in Fig. 2. A feature of novelty, however, consists in the provision of an integral upper extension 22 on the lamination which extension is so shaped as to afford a substantially U-shaped recess 23. In this manner clips are provided to receive the ends of the magnets 10, as shown in Fig. 1, but these clips are integral parts of the core and require no attachment thereto, thereby dispensing with one joint in the magnetic circuit. The magnets 10, according to the illustration given in Fig. 1, are first loosely received in the clips described and subsequently forced into intimate frictional engagement therewith by the use of shims or wedges 24. They may, however, be otherwise frictionally held in place, if desired.

The magnets 10 are customarily wider than the core and usually pole pieces are provided as intermediate elements to enable the wide magnet to be attached to the narrower core. However, according to this invention, the usual pole pieces are dispensed with and supplementary laminations, such as 25, are provided. These laminations, like those shown at 21, have U-shaped magnet receiving recesses 23 and are applied in groups, with one group on each side of the core 11, to broaden out the magnet receiving portion thereof, as shown in Fig. 4.

The laminations 21 and 25 are provided with holes 26 to receive rivets 27 or the like, whereby the grouped laminations may be clamped together adjacent the magnet receiving portions thereof. These laminations are also provided with holes 28 to receive the bolts 18, whereby they are further clamped together and also held to frame 15, as described. The laminations 21 also have holes 29 to receive the bolts 19, described.

While the invention has been disclosed as adapted for use in connection with bar magnets, it may, if desired, be used in connection with magnets of other shapes for the U-shaped recesses 23 may be made to face in any desired direction.

From the foregoing description it will be readily apparent that a much simpler and less expensive way of constructing the magnetic field structure of a magneto has been provided. No machining operations whatever are required in this connection. The laminations are simple punchings formed with the necessary holes. They merely need to be grouped and clamped together. The magnets are sheared off lengths of hardened steel and require no machining, drilling or heat treatment. Their ends are merely slipped into the recesses 23 and frictionally clamped by the wedges or shims 23.

The invention has been disclosed herein in an embodiment at present preferred, for illustrative purposes but the scope of the invention is defined by the appended claims rather than by the foregoing description.

Claims:

1. In a magneto, two cores made up of laminations and each having an integral extension provided with a recess, said recesses being formed in the adjacent sides of said cores so that they open toward one another, the walls of each of said recesses affording two spaced parallel seats connected by a single straight connecting surface disposed at right angles to said seats, a plurality of bar magnets mounted in superposed relation and having their ends received in said recesses and wedges interposed between certain of said magnets to separate the same and force the outer magnets against said seats.

2. In a magneto, two cores arranged in spaced parallel relation and made up of laminations, integral extensions provided on each of the latter at one end to form oppositely directed substantially U-shaped holding clips, a frame, a series of laminations in the form of substantially U-shaped holding clips arranged between the first named laminations and the frame and secured together with the first named laminations to said frame to increase the width of the clips afforded by the latter, and one or more magnets having their ends received in said clips.

3. In a magneto, two cores arranged in spaced parallel relation and made up of laminations, integral extensions provided on each of the latter at one end to form oppositely directed substantially U-shaped holding clips, a frame, a series of laminations in the form of substantially U-shaped holding clips arranged on opposite sides of the first named laminations to broaden out the clips afforded by the latter, means for securing all said laminations together and to said frame, and one or more magnets having their ends received in said clips.

TERRENCE G. LOUIS.